United States Patent [19]

Allen et al.

[11] Patent Number: 5,939,195

[45] Date of Patent: Aug. 17, 1999

[54] COLOR-PLUS-CLEAR COMPOSITE COATING AND PROCESS AND COATED ARTICLE FOR IMPROVED PROPERTIES

[75] Inventors: Karen B. Allen, Irwin; Kurt A. Humbert, Allison Park; Kurt G. Olson, Gibsonia; Edward R. Coleridge, Lower Burrell; Roxalana L. Martin, Pittsburgh, all of Pa.

[73] Assignee: PPG Industries Ohio, Inc., Cleveland, Ohio

[21] Appl. No.: 08/803,568

[22] Filed: Feb. 20, 1997

Related U.S. Application Data

[60] Provisional application No. 60/011,917, Feb. 20, 1996.

[51] Int. Cl.$^6$ ................................................ B32B 27/38
[52] U.S. Cl. ...................... 428/413; 525/438; 525/533
[58] Field of Search ............................ 428/413; 525/438, 525/533

[56] References Cited

U.S. PATENT DOCUMENTS

| | | | |
|---|---|---|---|
| Re. 32,261 | 10/1986 | Hirota et al. ............................ | 525/285 |
| 3,919,347 | 11/1975 | Katsimbas ............................... | 260/836 |
| 4,002,699 | 1/1977 | Labana et al. .......................... | 260/851 |
| 4,085,260 | 4/1978 | Labana et al. .......................... | 526/16 |
| 4,147,679 | 4/1979 | Scriven et al. ......................... | 260/29.2 |
| 4,220,679 | 9/1980 | Backhouse ............................. | 427/401 |
| 4,402,983 | 9/1983 | Craven ................................... | 428/335 |
| 4,403,003 | 9/1983 | Backhouse ............................. | 427/407.1 |
| 4,650,718 | 3/1987 | Simpson et al. ........................ | 428/413 |
| 4,681,811 | 7/1987 | Simpson et al. ........................ | 428/413 |
| 4,703,101 | 10/1987 | Singer et al. ........................... | 528/87 |
| 4,731,290 | 3/1988 | Chang .................................... | 428/335 |
| 4,789,707 | 12/1988 | Nishimura et al. ..................... | 525/157 |
| 4,801,680 | 1/1989 | Geary et al. ............................ | 528/272 |
| 4,804,581 | 2/1989 | Geary et al. ............................ | 428/332 |
| 4,933,214 | 6/1990 | Sugiura et al. ......................... | 427/379 |
| 4,988,767 | 1/1991 | Pettit, Jr. ............................... | 525/194 |
| 5,008,335 | 4/1991 | Pettit, Jr. ............................... | 525/111 |
| 5,013,791 | 5/1991 | Kerr et al. .............................. | 525/113 |
| 5,055,524 | 10/1991 | Pettit, Jr. et al. ...................... | 525/172 |
| 5,071,904 | 12/1991 | Martin et al. .......................... | 524/458 |
| 5,100,735 | 3/1992 | Chang .................................... | 428/515 |
| 5,196,485 | 3/1993 | McMonigal et al. ................... | 525/327.3 |
| 5,212,245 | 5/1993 | Franks et al. ........................... | 525/223 |
| 5,256,452 | 10/1993 | McMonigal et al. ................... | 427/407.1 |
| 5,256,493 | 10/1993 | Szita et al. ............................. | 428/524 |
| 5,342,882 | 8/1994 | Gobel et al. ........................... | 524/832 |
| 5,385,656 | 1/1995 | Doebler et al. ........................ | 204/181.1 |
| 5,397,646 | 3/1995 | Nickle et al. .......................... | 428/423.1 |
| 5,407,707 | 4/1995 | Simeone et al. ....................... | 427/410 |
| 5,510,148 | 4/1996 | Taljan et al. ........................... | 427/409 |
| 5,574,103 | 11/1996 | Wu et al. ............................... | 525/127 |
| 5,593,735 | 1/1997 | Wu et al. ............................... | 427/461 |

FOREIGN PATENT DOCUMENTS

| | | |
|---|---|---|
| 2040185 | 10/1991 | Canada . |
| 0 602 559 | 6/1994 | European Pat. Off. . |
| 0 603 659 | 6/1994 | European Pat. Off. . |
| 0 652 265 | 5/1995 | European Pat. Off. . |
| 0 761 787 | 3/1997 | European Pat. Off. . |
| WO 94/11451 | 5/1994 | WIPO . |

OTHER PUBLICATIONS

Principals of Polymer Chemistry, Flory, Cornell Univ. Press, Ithaca, New York, 1953, pp. 52–57.

*Primary Examiner*—Randy Gulakowski
*Attorney, Agent, or Firm*—Kenneth J. Stachel; Ann Marie Cannoni

[57] ABSTRACT

A composite coating of a water-borne basecoat and an epoxy-acid clearcoat has improved performance characteristics of reduced yellowing or reduced tendency to chip through the formulation of the composite coating and the process for its application. The process comprises applying to the substrate a film-forming composition to form a basecoat and applying to the basecoat an epoxy-acid clear film-forming composition to form a transparent topcoat over the basecoat. The basecoat is a coating composition comprising a polymeric film-forming resin, aminoplast crosslinking agent and a pigment wherein the crosslinking agent is a partially or fully alkylated aminoplast and has a lower or higher imino content. The lower imino content promotes reduced yellowing of the clearcoat and the higher imino content promotes improved chip resistance when the pigment of the water-borne basecoat reduces yellowing effects. The transparent topcoat, or clearcoat, has an epoxy film forming resin and a polycarboxylic acid crosslinking agent.

31 Claims, No Drawings

COLOR-PLUS-CLEAR COMPOSITE COATING AND PROCESS AND COATED ARTICLE FOR IMPROVED PROPERTIES

This application claims the benefit of U.S. Provisional Application No. 60/011,917, filed Feb. 20, 1996.

The present invention relates to composite coatings of a pigmented or colored water-based basecoat composition for improved properties of reduced yellowing or improved chip resistance of epoxy-acid clearcoats like powder clearcoats in composite coatings. Additionally, the present invention relates to a process for preparing multi-layered composite coatings and coated articles and the coated articles themselves having particular interest in the automotive field.

Color-plus-clear coating systems involving the application of a colored or pigmented basecoat to a substrate followed by the application of a transparent or clear topcoat to the basecoat have become conventional as original finishes for automobiles. The color-plus-clear systems have outstanding gloss and distinctness of image, and the clearcoat is particularly important for these properties.

In recent years high solids solvent-borne coatings, water-borne coatings, and powder coatings have become increasingly popular because these coatings are inherently low in volatile organic content (VOC), which can reduce emissions of organic volatiles into the air during the application process. For instance, useful powder coatings include those with epoxy condensation polymers, vinyl chloride polymers and acrylic resins as the main film-forming polymers. The advantage of the acrylic resin system over the epoxy condensation polymers and vinyl chloride polymers is that acrylic resins provide superior outdoor durability, are more resistant to heat, and have better solvent and chemical resistances. The use of glycidyl functional acrylic resins provide such desired properties.

As there are advantages and disadvantages with the different types of film-forming resins in the coatings, the different coatings themselves have advantages and disadvantages in application and performance of the coated article as compared to solvent-based coatings. For instance, the water-borne coatings are more sensitive to humidity during application, and powder coatings require a careful balance of materials and process conditions for application to achieve good flow and film formation for the coated article. When two or more of these more environmentally-friendly coating compositions are combined into a composite coating like a color-clear composite coating, the particular sensitivities and narrower application tolerances of the different types of coatings and intermingling of coatings can conflict.

Also, in today's competitive market, automobile manufacturers demand more stringent requirements on coatings properties and performance. Good exterior durability, acid etch, water spot resistance, and excellent gloss and appearance are typical examples. Also, improved chip resistance is a performance characteristic for which the market and manufacturers continue to search. Currently, some of these properties can be achieved using epoxy-acid cured liquid coatings. However, liquid coatings have significantly higher VOC levels than powder coatings, which essentially have zero VOC levels.

Although epoxy-acid systems are known for powder coatings, they are presently not widely used commercially for automotive OEM clear coatings in color-plus-clear composite systems because of inferior appearance such as yellowing. In composite coatings poorer appearance of the powder clearcoat may result from the various sensitivities, intermingling, and application conditions of the basecoat and/or its components along with clearcoat and/or its components.

It is desirable to provide a color-plus-clear composite coating of a water-based base or color coat and epoxy-acid clearcoat that has improved appearance and reduced yellowing and, where possible, improved chip resistance. Also, it is desirable to provide a process for applying such a composite coating for a manufacturing situation.

SUMMARY OF THE INVENTION

In accordance with the present invention, improved color-plus-clear composite coating appearance properties of reduced yellowing or improved chip resistance of a waterborne basecoat and epoxy-acid clearcoat and process for applying a composite coating to a substrate are provided.

The composite coating has: A) water-borne basecoat coating composition with at least 1) one or more water soluble, dispersible or reducible film-forming polymeric binders with pendent acid functionality, and 2) a water soluble or dispersible aminoplast crosslinking agent that is either i) an alkylated aminoplast having a lower imino content for non-yellowing characteristics, or ii) a higher imino content aminoplast for reduced chip characteristics. The lower imino content is one where the imino group is less than 55 weight percent of the functional groups of the aminoplast. A higher imino content is one where the imino group is of greater than 15 weight percent of the functional groups of the aminoplast. The higher imino content aminoplast is present in water-borne color coats which have a reduced tendency to yellow such as those with black or similarly dark pigments.

The film-forming polymer has the acid groups neutralized with an organic base such as primary, secondary and/or tertiary amine, alkanolamines, and alkyl and dialkyl diamines and triamines to provide a pH for the aqueous composition of the film-forming polymer of about 7.0 to 9. The concentration of neutralizing an organic base added before, during or after the addition of water in order to neutralize the carboxylic groups is such that the degree of neutralization is from 0.5 to 1.5 equivalents of amine per acid group like the carboxyl group. The film-forming polymer is present in the color coat composition in an amount of from 30 to 75 weight percent based on the resin solids content of the base coat composition. The aminoplast condensation crosslinking agent is present in the water-based base coat composition in an amount based on the resin solids of the water-based basecoat of less than 60 weight percent.

Additionally, the water-based basecoat is formulated to have a solids level in weight percent solids in the range from 30 to 80 and a pigment to binder ratio in the range of greater than 0.1/1 up to and including 2/1, and a dried film thickness on application to a substrate of 0.6 to 2 mils. The water-based color coat or basecoat also is formulated so that the epoxy clearcoat can be applied to it after at least about 85 weight percent of the water has been removed.

The transparent coat, or clearcoat, can be derived from a flexible, curable film-forming composition comprising a single or multiple component liquid composition or powder coating composition. The clearcoat is an epoxy-acid coating composition in that one or more epoxy functional copolymers in the coating constitute the predominant film forming polymer. The coating composition comprises epoxy functional copolymer(s) having a number average molecular weight generally in the range of around 1,000 to 20,000 and a polycarboxylic acid crosslinking agent usually along with other additives. The epoxy functional copolymers are usually present in an amount of the clearcoat coating of 10 to 90 percent by weight, and the polycarboxylic acid crosslinker is usually present in an amount of 10 to 40 percent by weight. Here, the percent by weight is based on the weight of the copolymers and the acid crosslinker. Generally for each equivalent of epoxy, the clearcoat coating has around 0.3 to around 3.0 equivalents of acid like carboxyl.

The process for producing the color-plus-clear coating of the present invention comprises applying to the substrate a water-based basecoat and applying to the basecoat the epoxy-acid clear film-forming composition to form a transparent topcoat over the basecoat. The basecoat has an aminoplast crosslinking agent of either the lower imino content to reduce yellowing or the higher imino content to improve chip resistance of reduced yellowing basecoats. After the basecoat is flash dried, the clearcoat is applied and the composite coating is cured at elevated temperatures to dry and cure the coatings.

DETAILED DESCRIPTION OF THE INVENTION

The colored basecoat coating used in the "color-plus-clear" composite coating of the present invention is preferably a water-borne film-forming composition. The film-forming composition comprises a polymeric film-forming resin, a crosslinking agent, and a pigment to act as the colorant. Particularly useful polymeric film-forming resins are acrylic polymers, polyesters, including alkyds, and polyurethanes. Generally, these polymers can be any polymer of these types made by any method known to those skilled in the art. When the basecoat composition is water-borne, the polymers are water-dispersible or emulsifiable and preferably of limited water solubility.

The acrylic polymers are copolymers of one or more alkyl esters of acrylic acid or methacrylic acid optionally together with one or more other polymerizable ethylenically unsaturated monomers. These polymers are generally of the thermosetting crosslinking type. Suitable alkyl esters of acrylic acid or methacrylic acid include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such acrylonitrile and methacrylonitrile; vinyl and vinylidene halides such as vinyl chloride and vinylidene fluoride and vinyl esters such as vinyl acetate. Acrylic polymers can be prepared via aqueous emulsion polymerization techniques and used directly in the preparation of aqueous coating compositions or can be prepared via organic solution polymerization techniques with groups capable of salt formation such as acid or amine groups. Upon neutralization of these groups with a base or an acid, the polymers can be dispersed into an aqueous medium. Generally, any method of producing such polymers that is known to those skilled in the art utilizing art-recognized amounts of monomers can be used.

Suitable functional monomers may be used in addition to the other acrylic monomers mentioned above for crosslinking purposes and include, for example, acrylic acid, methacrylic acid, hydroxyalkyl acrylates, and hydroxyalkyl methacrylates. Preferably, the hydroxyalkyl group of the latter two types of compounds contains from about 2 to 4 carbon atoms. Examples thereof are hydroxyethyl acrylate, hydroxyethyl methacrylate, hydroxypropyl acrylate, hydroxypropyl methacrylate, 4-hydroxybutyl acrylate and 4-hydroxybutyl methacrylate and the like. Also, the acrylic polymer can be prepared with N-(alkoxymethyl)acrylamides and N-(alkoxymethyl)methacrylamides.

Besides acrylic polymers, the polymeric film-forming resin for the basecoat composition may be an alkyd resin or a polyester. Such polymers may be prepared in a known manner by condensation of polyhydric alcohols and polycarboxylic acids. Suitable polyhydric alcohols include ethylene glycol, propylene glycol, butylene glycol, 1,6-hexylene glycol, neopentyl glycol, diethylene glycol, glycerol, trimethylolpropane, and pentaerythritol.

Suitable polycarboxylic acids are known to those skilled in the art and include succinic acid, adipic acid, azelaic acid, sebacic acid, maleic acid, fumaric acid, phthalic acid, tetrahydrophthalic acid, hexahydrophthalic acid and trimellitic acid. Besides the polycarboxylic acids mentioned above, functional equivalents of the acids, such as anhydrides where they exist, or lower alkyl esters of the acids, such as the methyl esters, may be used.

Where it is desired to produce air-drying alkyd resins, suitable drying oil fatty acids may be used and include those derived from linseed oil, soya bean oil, tall oil, dehydrated castor oil or tung oil. The polyesters and preferably the alkyd resins contain a portion of free hydroxyl and/or carboxyl groups which are available for further crosslinking reactions.

Polyurethanes can also be used as the polymeric film-forming resin in the basecoat composition. Among the polyurethanes which can be used are polymeric polyols which are prepared by reacting the polyester polyols or acrylic polyols such as those mentioned above with a polyisocyanate such that the OH/NCO equivalent ratio is greater than 1:1 so that free hydroxyl groups are present in the product.

The organic polyisocyanate which is used to prepare the polyurethane polyol can be an aliphatic or an aromatic polyisocyanate or a mixture of the two. Diisocyanates are preferred, although higher polyisocyanates can be used in place of or in combination with diisocyanates. Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2,4-benzene triisocyanate and polymethylene polyphenyl isocyanate.

The polyester and polyurethane may be prepared with unreacted carboxylic acid groups which upon neutralization with bases, such as amines, allows for dispersion into aqueous medium for use in a water-borne coating composition.

Examples of suitable types of basecoat compositions, with which the aminoplast and neutralizing base as described for the present invention can be used, include the water-borne compositions disclosed in U.S. Pat. No. 4,403,003 where the polymeric resinous compositions used in preparing these compositions can be used as the polymeric film-forming resin in the practice of this invention. Also, water-based polyurethanes such as those prepared in accordance with U.S. Pat. No. 4,147,679 can be used as the polymeric film-forming resin in the basecoat composition. In a preferred embodiment of the invention, when the film-forming composition used as the basecoat layer is water-borne, it is generally prepared by forming an aqueous dispersion of a blend of acrylic and polyester and/or polyurethane materials in microparticulate form by a high-stress technique using a homogenizer. This technique is described in U.S. Pat. No. 5,071,904, incorporated herein by reference.

In the high-stress technique, the polymeric film-forming resin is a latex which comprises polymeric microparticles prepared by forming a mixture in aqueous medium of an ethylenically unsaturated monomer or mixture of ethylenically unsaturated monomers with greater than 30 percent by weight of a substantially hydrophobic polymer; the percent by weight being based on the weight of ethylenically unsaturated monomer(s) and hydrophobic polymer. The hydrophobic polymer is essentially free of repeating acrylic or vinyl units in the polymer backbone and has a number average molecular weight of greater than about 300. The term "molecular weight" refers to a number average molecular weight as determined by gel permeation chromatography using a polystyrene standard. Therefore, it is not an absolute number average molecular weight which is measured but a number average molecular weight which is a measure relative to a set of polystyrene standards. The hydrophobic polymer is preferably a polyester or polyurethane. The monomer(s) and hydrophobic polymer are particularized into microparticles by high-stress techniques using a homogenizer followed by polymerizing the ethylenically unsaturated monomer(s) to form polymeric microparticles which are stably dispersed in the aqueous medium. These microparticles can be internally crosslinked so as to form microgels.

The polymeric film-forming resin is generally present in the basecoat composition in amounts of about 10 to about 99 percent by weight and preferably 35 to 75 percent by weight, and most preferably about 40 to 60 percent by weight, based on total weight of resin solids in the basecoat composition.

The polymer of the latex has the acid functional groups neutralized with an organic base to form an anionic group for water dispersibility so that the degree of neutralization preferably is comparable to 0.5 to 1.2 and most preferably around 1 to just greater than 1 equivalents of organic base-like amine per acid group like carboxyl group. The neutralization assists in stabilizing the water-based basecoat and provides pH for the aqueous composition of the film-forming polymer of about 7.0 to 9. Preferably, the neutralization raises the pH of the film-forming polymer from around 4 to a range of about 7 to about 8.5.

The neutralizing organic base can be one or more of the following compounds: primary, secondary and/or tertiary amine; alkylamine; an amino alcohol; alkanolamine; and/or alkyl or dialkyl diamines. The organic base can be added before, during or after the addition of water to the film-forming polymer. Suitable non-limiting examples of alkanolamine include: aminoethyl propanol; allylamine; N,N-dimethylethanolamine; 1-amino-2-propanol; 3-amino-1-propanol; triethanolamine; 2,2-dimethanol oxazolidine-1,4, 2-methyl; 1-2-methanol oxazolidine-1,4; diethanolamine; diisopropanolamine; ethanolamine; and 2-ethyl amino ethanol. Typically useful secondary amines are: diisobutylamine; diisopropylamine; 2,2-dimethyl oxaolidine-1,4; 2,2-diethyl oxazolidine-1,4; dibenzylamine; dibutylamine; dicyclohexylamine; didodecylamine; diethylamine; 2,2-diethylhexylamine; dihexylamine; dimethylamine; dioctylamine; dipentylamine; dipropylamine; 2(2-hydroxyethylamino)-2-(hydroxymethyl)-1,3-propanediol; 2-methyl aminoethanol; 2,(2-amino ethylamino) ethanol; 3,3 diamino-dipropylamine; N-methylmorpholine and the like. Typically useful tertiary amines include, without limitation: trialkyl amine, like trimethyl amine and triethyl amine; dialkyl aniline, like dimethyl aniline, diethyl aniline, triphenyl amine, amine-methyl propanol, and dimethyl isopropanol amine. Typically useful non-limiting alkyl and dialkyl diamines and triamines include: ethylenediamine; diaminopropane; hexamethylenediamine; hydrazine; aminoethylethanolamine; diethylene triamine; N-methyl ethylene diamine; and N,N-dimethyltriethylenediamine. Although the basecoat composition of the present invention may be cationic, anionic or nonionic, preferably it is anionic.

The basecoat composition further comprises a crosslinking agent which is one or more water soluble, dispersible formaldehyde condensation crosslinking agents that have either the lower imino content of around less than 55 weight percent or the higher imino content of at least 15 weight percent of the functional substituents of the aminoplast. Preferably, the lower imino content is less than 30 and most preferably less than 20 weight percent of the functional substituents of the aminoplast. Preferably, the higher imino content is greater than 20 weight percent of the functional substituents of the aminoplast. The lower imino content crosslinking agent generally is a substantially alkylated aminoplast, while the higher imino content crosslinking agent can be a partially alkylated aminoplast. The lower or higher imino level can be assessed by any method known to those skilled in the art such as determining the residual cyclic imino ether monomer by means of an analytical procedure such as gas chromatography, thin layer chromatography, and quantitative determination by the potential difference titration method.

For the lower imino content aminoplast crosslinker, substantial alkylation of the aminoplast crosslinking agent includes, for example, methylated and/or butylated or isobutylated melamine formaldehyde resin that is substantially monomeric by having a degree of polymerization of about less than 3 and preferably from 1 to 2. These formaldehyde condensates can be obtained by any method known to those skilled in the art. For instance, the condensates can be obtained by reaction of formaldehyde with urea, N-alkylurea, dicyanodiamide or glycoluril, melamine, benzoquanamine or acetoquanamine or mixtures thereof. This is followed by etherification with low-molecular weight monoalcohols. The aldehyde is preferably formaldehyde in aqueous or alcoholic form as the semi-acetate. Paraformaldehyde, for example, is hydrolyzed or depolymerized in the presence of dilute acids or bases in warm water or alcohols. Alternatively, other aldehydes such as glyoxal, acetaldehyde, isobutyraldehyde or furfurol can be used. Usually, the preferred etherification is methylolization with formaldehyde with the addition of weak bases where, 3 to 6 methanol groups per molecule of melamine can be reacted. Melamine formaldehyde resins with a mixture of etherification can also be used. Generally, these can range from mostly methylated groups with a minor amount of the butylated groups to a substantial amount of the butylated groups with a minor amount of the methylated groups as shown in Table A. Such crosslinking agents typically have a number average molecular weight of about 300 to 600. In addition to the melamine formaldehyde having a mixture of the ethylated groups in the condensate itself, combinations of a methyl etherified methylol melamine resin and of a butyl etherified methylol melamine resin can also be used.

The most preferred lower Imino aminoplast crosslinking agents of the invention are selected from a group consisting of substantially fully etherified, substantially fully methylolated, substantially monomeric glycoluril, melamine, benzoguanamine, cyclohexane carboguanamine, urea, substituted linear and cyclic ureas, and mixtures thereof. Generally, the imino group functionality of the aminoplast can be that such as methoxymethylimino:

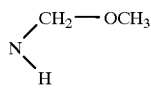

Useful lower imino and highly alkylated melamine formaldehyde condensates in the present invention include the Cymel 300 and 1100 series condensates available from Cytec Inc. of Wayne, New Jersey. These condensates, as all of those indicated in Table A, have a lower imino content of less than around 55 weight percent of the functional substituents of the condensate and preferably less than 30 weight percent.

methylol melamine resin to which butanol is added for ether exchange reaction under an acid condition.

A particularly preferred lower imino crosslinking agent is Cymel 303 resin, which is a fully methylated melamine-formaldehyde resin with a degree of polymerization (average number of triazine units per molecule) of approximately 1.75 and a maximum free formaldehyde level of 0.5 percent. This material is supplied neat (minimum solids level 98 percent).

Another suitable lower imino example is Cymel 1133 resin which is a fully alkoxylated melamine-formaldehyde resin wherein the alkoxy groups are a mixture of methyl and butyl groups. This material has a degree of polymerization of 1.6, a maximum free formaldehyde level of 0.2 percent and is supplied neat (minimum solids 98 percent).

TABLE A

| Melamine formaldehyde condensate | % Nv[a] | imino (NH)[b] | methylol (CH$_2$OH)[c] | (CH$_2$OMe)[d] | (CH$_2$OBu)[e] | DP[f] | Viscosity[g] |
|---|---|---|---|---|---|---|---|
| highly alkylated, low imino | | | | | | | |
| Cymel 300 | 100 | 0 | 3 | 97 | 0 | 1.35 | solid |
| Cymel 301 | 100 | 0 | 10 | 90 | 0 | 1.5 | W–Z2 |
| Cymel 303 | 100 | 0 | 5 | 95 | 0 | 1.75 | X–Z2 |
| Cymel 350 | 100 | 0 | 12 | 88 | 0 | 1.55 | Z2–Z5 |
| Cymel 1130 | 100 | 0 | 3 | 72 | 25 | 2.5 | W–Z2 |
| Cymel 1133 | 100 | 0 | 3 | 49 | 48 | 1.6 | S–W |
| Cymel 1156 | 100 | 0 | 6 | 0 | 94 | 2.9 | Z1–Z3 |
| Cymel 1116[h] | 100 | 0 | 3 | 44 | 53 | 1.6 | U–Y |
| Cymel 1168[i] | 100 | 0 | 3 | 49 | 48 | 1.6 | X–Z2 |
| partially alkylated | | | | | | | |
| Cymel 370[j] | 88 | 3 | 30 | 67 | 0 | 2.5 | Z2–Z4 |
| Cymel 373[k] | 85 | 8 | 36 | 56 | 0 | 2 | Z–Z4 |
| Cymel 380[j] | 80 | 3 | 31 | 66 | 0 | 2.5 | V–Z |
| Cymel 202 | 80 | 26 | 10 | 38 | 26 | 1.9 | |
| Resimine 755 | 100 | 4 | 11 | 46 | 39 | 1.4 | |

[a]percent non-volatiles.
[b]imino group in the melamine formaldehyde.
[c]methylol group in the melamine formaldehyde.
[d]methylated groups in the melamine formaldehyde.
[e]butylated groups in the melamine formaldehyde.
[f]degree of polymerization.
[g]as measured by Holt, at 25° C.
[h]in ethanol.
[i]in isopropanol solvent.
[j]in IBA.
[k]in water.

A suitable lower imino melamine formaldehyde condensate for the present invention is mixed alkyl etherified methylol melamine resin which has all of the butyl ether groups, methyl ether groups, and methylol groups but not all imino groups on a single melamine nucleus. It may be used in combination with methyl etherified methylol melamine resin and/or butyl etherified methylol melamine resin and/or mixed alkyl etherified methylol melamine resin. The resulting mixture has the average number of bound formaldehyde molecules, methyl ether groups, butyl ether groups, imino groups, and methylol groups per melamine nucleus and the average degree of polymerization for the melamine nuclei as specified in the invention. In addition, the mixed alkyl etherified methylol melamine resin may be a mixture of mononuclear molecules and polynuclear molecules. The mixed alkyl etherified methylol melamine resin used in the present invention is, for example, produced by heating melamine and formalin under a basic condition to yield methylol melamine. Subsequently said methylol melamine is reacted either with methanol and butanol under an acid condition, or with methanol alone to yield methyl etherified Another lower imino and substantially fully etherified, and substantially fully methylated, is the substantially monomeric Cymel® 1168 melamines crosslinking agent, which consists essentially of a mixture of methyl and isobutyl groups. It has an equivalent weight of 150 to 230. Also another lower imino and substantially methylated, and partially etherified, is the substantially oligomeric Cymel® 370 crosslinking agent which has color, maximum (Gardner 1963) of 1 and equivalent weight of 225 to 325. In contrast with the above-mentioned methyl etherified methylol melamine resin and butyl etherified methylol melamine resin, the mixed alkyl etherified methylol melamine resin has many advantages. It is readily available in the form of high solids content; hence, it contributes towards increasing the solids.

Another suitable lower imino example is Resimine 747 resin, which is a fully methylated melamine-formaldehyde resin similar in its composition to Cymel 303. This product is available from Monsanto Chemical Co., St. Louis, Missouri, USA, which offers a variety of Resimine products which are similar to the Cytec products. Examples are:

Resimine 755, which is a butylated/methylated melamine-formaldehyde resin similar to Cymel 1133; Resimine 872 and 881, which are fully butylated melamine-formaldehyde resins similar to Cymel 1156; and Resimine 714, which is similar to Cymel 373. Similar results are achievable when the lower imino cross-linking agent is a methylated urea-formaldehyde adduct.

The higher imino content aminoplast crosslinking agent and preferably melamine formaldehyde condensate crosslinking agent has the imino content of greater than 15 and preferably greater than 20 and up to about 65 weight percent of the functional substituents of the aminoplast. The higher imino content aminoplast can have some of the same afore-described alkylation products as the lower imino content aminoplast. The higher imino content aminoplast will not be fully alkylated, but the amount of such alkylation will be less over all or of the total alkylation products for the crosslinker than that for the lower imino content aminoplast. For instance nonexclusive examples of the types of higher imino content aminoplast crosslinkers are shown in Table A' below.

TABLE A'

| Melamine formaldehyde condensate | % Nv[a] | imino (NH)[b] | methylol (CH$_2$OH)[c] | (CH$_2$OMe)[d] | (CH$_2$OBu)[e] | DP[f] | Viscosity[g] |
|---|---|---|---|---|---|---|---|
| higher imino | | | | | | | |
| Cymel 202 | 80 | 26 | 10 | 38 | 26 | 1.9 | — |
| Cymel 327 | 90 | 22 | 10 | 68 | 0 | 1.75 | Z2–Z5 |
| Cymel 325 | 80 | 27 | 9 | 64 | 0 | 2.3 | X–Z1 |
| Cymel 323 | 80 | 33 | 6 | 61 | 0 | 1.8–2.2 | Z1–Z4 |
| Cymel 385 | 80 | 41 | 25 | 34 | 0 | 2.1–2.3 | U–W |
| Cymel 1158 | 80 | 30 | 10 | 0 | 60 | 2.7 | Z–Z3 |
| Resimine 7550 | 78 | 62 | 13 | 25 | 0 | 1.8 | Z–Z3 |

[a]–[g]has the same meaning as in Table A.

The crosslinking agent is present in the basecoat composition in amounts of less than 60 percent by weight, generally from about 20 to 60 percent by weight, based on total weight of resin solids in the basecoat composition. This amount is preferred for the lower imine content crosslinker when the other factors of organic base neutralization amount, pigment to binder ratio, and basecoat film thickness are controlled to the most favorable portions of their ranges. This is limiting excess organic base over that needed for neutralization of the carboxylic acid groups of the film-forming polymer, and having a high pigment to binder ratio and a low film thickness. Also, the application of the epoxy-acid clearcoat should be after substantial dehydration of the applied basecoat layer in the upper portion of the range of 85 to 98 weight percent of volatile constituents are removed. This is for a preferred solids content of the basecoat of 30 to 50 weight percent. Otherwise, it is most preferred to have the amount of the aminoplast crosslinking agent that is anything other than a fully alkylated aminoplast of less than 30 weight percent of the resin solids of the water-based basecoat. For the higher imino content crosslinker to reduce any potential yellowing problems, the basecoat preferably has a dark pigment such as black. Any such dark pigments known to those skilled in the art can be used such as carbon black and the like.

The coating composition used as the basecoat in the process of the present invention contains pigments to give it color. In general, the pigment is incorporated into the coating composition in amounts of about 1 to 80 percent, usually about 1 to 30 percent by weight based on total weight of the coating composition. Color pigments conventionally used in surface coatings include inorganic pigments such as titanium dioxide, iron oxide, chromium oxide, lead chromate, and carbon black, and organic pigments such as phthalocyanine blue and phthalocyanine green. Metallic flake pigmentation is also useful in the water-borne compositions used in the present invention. Suitable metallic pigments include, in particular, aluminum flake, copper bronze flake and metal oxide coated mica.

Optional ingredients in the basecoat composition are those which are well known in the art of formulating surface coatings and include surfactants, flow control agents, thixotropic agents, fillers, anti-gassing agents, organic co-solvents, catalysts, carriers and other customary auxiliaries. Examples of these materials and suitable amounts are described in U.S. Pat. Nos. 4,147,769; 4,220,679; 4,403,003 and 5,071,904, hereby all incorporated by reference for such teachings.

The basecoat compositions can be applied to the substrate by any of the conventional coating techniques such as brushing, spraying, dipping or flowing, but they are most often applied by spraying. The usual spray techniques and equipment for air spraying, airless spray and electrostatic spraying in either manual or automatic methods can be used. During application of the basecoat to the substrate, a film of the basecoat is formed on the substrate typically in a thickness of about 0.1 to 5 (2.5 to 127 microns) and preferably 0.1 to 2 mils (2.5 to 51 microns).

After forming a film of the basecoat on the substrate, the basecoat can be cured or alternately given a drying step in which solvent, that is, organic solvent and/or water, is driven out of the basecoat film by heating or an air-drying period before application of the clearcoat. Such a drying step is preferably done to prevent migration of various components into the subsequently applied epoxy-acid clearcoat which may cause yellowing. Suitable drying conditions will depend on the particular basecoat composition and on the ambient humidity with certain water-borne compositions, but in general, a drying time of from about 1 to 15 minutes at a temperature of about 75° F. to 200° F. (21° C. to 93° C.) will be adequate.

The transparent or clear topcoat layer used in the "color-plus-clear" composite coating aspect of the present invention can be a liquid or powder epoxy-acid clearcoat composition. The multi-package and single-package liquid compositions disclosed in U.S. Pat. Nos. 5,256,452 at columns 1–25 and 4,650,718 at columns 1–16, hereby incorporated by reference, are suitable compositions.

The film-forming composition in the curable composition of the present invention preferably comprises a mixture of a polyepoxide and a polyacid crosslinking agent. Preferably, the polyepoxide is present in the film-forming composition in amounts of about 10 to 90, more preferably from about 25 to 50 percent by weight based on total weight of resin solids in the film-forming composition that is a liquid coating composition. Preferably, the polyepoxides have a glass transition temperature (Tg) less than 50° C., more preferably less than 30° C. The Tg is described in PRINCIPLES OF POLYMER CHEMISTRY, Flory, Cornell University Press, Ithaca, New York, 1953, pages 52–57. The Tg can be calculated as described by Fox in Bull. Amer. Physic. Society, 1,3, page 123 (1956). The Tg can be measured experimentally by using a penetrometer such as a DuPont 940 Thermomedian Analyzer or by differential scanning calorimetry (DSC) at a rate of heating of 18° F. (10° C.) per minute with the Tg taken at the first inflection point. The Tg of the polymers as used herein refers to the calculated values unless otherwise indicated.

Among the polyepoxides which can be used are epoxy-containing acrylic polymers which are preferred, epoxy condensation polymers such as polyglycidyl ethers of alcohols and certain polyepoxide monomers and oligomers. Epoxy-containing acrylic polymers are preferred because they yield products which have the optimum combination of coating properties; i.e., smoothness, gloss, durability and solvent resistance. The epoxy-containing acrylic polymer is a copolymer of an ethylenically unsaturated monomer having at least one epoxy group and at least one polymerizable ethylenically unsaturated monomer which is free of epoxy groups. The preparation of the epoxy-containing acrylic polymer may be conducted as disclosed in U.S. Pat. No. 4,650,718, incorporated herein by reference. The epoxy-containing acrylic polymer typically has a number average molecular weight between about 1000 and 20,000, preferably about 1000 to 10,000, and more preferably about 1000 to 5000.

The film-forming composition in the curable clearcoat composition of the present invention further includes a polyacid crosslinking agent present in the film-forming composition in amounts of about 10 to 90, preferably 25 to 75 percent by weight based on total weight of resin solids in the film-forming composition of the clearcoat. The polyacid crosslinking agent has a high average acid functionality. More specifically, the polyacid crosslinking agent on average contains more than two acid groups per molecule, more preferably three or more, and most preferably four or more, such acid groups being reactive with the polyepoxide to form a crosslinked coating as indicated by its resistance to organic solvent. The parameter of greater than two acid groups per molecule is intended to encompass mixtures of polyacid crosslinking agents in which di-functional curing agents are mixed with tri- or higher functionality polyacid crosslinking agents. Polyacid crosslinking agent mixtures including up to about 50 percent of a di-functional curing agent with a tri-functional curing agent are suitable. Higher percentages of di-functional material can be used if the remainder of the curing agent mixture is higher than tri-functional or if the polyacid crosslinking agent mixture is used with a highly functional polyepoxide component. The acid functionality is preferably carboxylic acid, although acids such as a phosphorus-based acid may be used. Preferably, the polyacid crosslinking agent is a carboxylic acid terminated material having, on average, greater than two carboxylic acid groups per molecule. Among the polyacid crosslinking agents which may be used are carboxylic acid group-containing polymers such as acrylic polymers, polyesters, and polyurethanes; oligomers such as ester group-containing oligomers, which are preferred; and monomers. Suitable art-recognized polyacid crosslinking agents include those described in U.S. Pat. Nos. 4,650,718; 4,681,811; and 4,703,101, all incorporated herein by reference.

The equivalent ratio of the reactants present in the film-forming composition of the clearcoat is adjusted such that for each equivalent of epoxy there are around 0.3 to around 3.0, preferably 0.75 to 1.5 equivalents of carboxyl (anhydride, if present, is considered monofunctional).

The film-forming composition for the clearcoat may also contain additional materials as known to those skilled in the art. For example, an anhydride for improved cure response and copolymer of an alpha olefin and olefinically unsaturated anhydride for improved humidity resistance of the cured coating can be used.

The curable particulate epoxy functional copolymer for use with polyacid materials can be selected from those well known in the art of powder coating compositions. They can be, for example, an epoxy resin such as an epoxy group-containing acrylic polymer or a polyglycidyl ether of a polyhydric alcohol and a suitable curing agent for the epoxy resin such as the polyfunctional carboxylic acid group-containing material or a dicyanamide. Examples of curable particulate epoxy copolymers are described in Reissue U.S. Pat. No. 32,261 and U.S. Pat. No. 4,804,581. Examples of other curable particulate resinous materials are carboxylic acid functional resins such as carboxylic acid functional polyesters and acrylic polymers and suitable curing agents for such materials such as triglycidyl isocyanurate and beta-hydroxyalkylamide curing agents as described, for example, in U.S. Pat. Nos. 4,801,680 and 4,988,767.

The epoxy functional copolymer is prepared by copolymerizing a glycidyl functional ethylenically unsaturated monomer, typically a glycidyl functional acrylic monomer, such as glycidyl acrylate or glycidyl methacrylate, with an ethylenically unsaturated monomer or mixture of monomers free of glycidyl functionality.

In the practice of the invention, the glycidyl functional monomer is typically copolymerized with a monomer with a Tg greater than 200° F. (93° C.). A high Tg monomer is assists in preventing caking and instability problems associated with powder coatings. Suitable monomers include methyl methacrylate and styrene as well as methacrylic acid ester or acrylic acid ester having an alicyclic hydrocarbon group having 5 to 22 carbon atoms, more suitably 5 to 10 carbon atoms in the ester portion. Suitable examples include: cyclopentyl methacrylate, cyclohexyl methacrylate, methylcyclohexyl methacrylate, trimethylcyclohexyl methacrylate, norbornylmethacrylate, norbornylmethyl methacrylate, isobornyl methacrylate and the like. The amount of styrene on a weight percent basis of the total monomers for the epoxy copolymer is up to about 16 weight percent and preferably from about 1 to about 10 weight percent. When styrene is absent from the epoxy copolymer, it is preferred to have at least one of the aforementioned high Tg monomers as monomers to prepare the epoxy copolymer.

In addition to the glycidyl functional ethylenically unsaturated monomer and high Tg monomers, a different copolymerizable ethylenically unsaturated monomer or mixture of monomers can also be present. Examples of such monomers include esters of acrylic acid or methacrylic acid such as ethyl acrylate, propyl acrylate, n-butyl acrylate, isobutyl acrylate, t-butyl acrylate, 2-ethylhexyl acrylate, lauryl acrylate, ethyl methacrylate, propyl methacrylate, n-butyl methacrylate, isobutyl methacrylate, t-butyl methacrylate, lauryl methacrylate, 2-ethylhexyl methacrylate, and so forth. Cyclic esters such as cyclohexyl acrylate and cyclohexyl methacrylate, as well as hydroxyalkyl esters such as 2-hydroxyethyl acrylate or methacrylate, 2-hydroxypropyl acrylate or methacrylate may also be used. In addition, vinyl aliphatic or vinyl aromatic compounds other than alpha-methyl styrene dimer which is considered a chain transfer agent, such as acrylonitrile, methacrylonitrile or styrene can be used.

The epoxy functional copolymer can be prepared by traditional free radical initiated polymerization techniques using suitable catalysts which include organic peroxides and azo-type compounds and chain transfer agents such as alpha-methyl styrene dimer and tertiary dodecyl mercaptan.

The epoxy-functional copolymer usually has: (a) between 25 to 75 percent by weight, based on weight of the copolymer of the glycidyl functional ethylenically unsaturated monomer; and (b) usually between 25 to 75 percent of a copolymerizable ethylenically unsaturated monomer or mixture of monomers free of glycidyl functionality. The percentages by weight are based on the total weight of (a) and (b) as 100 percent. Preferably, the copolymer has: (a') 35 to 55 percent by weight of the glycidyl functional monomer; (b') 40 to 60 percent by weight of one or more copolymerizable ethylenically unsaturated monomers having a Tg greater than 200° F. (93° C.), such as styrene and methylmethacrylate; and (c') from around 5 to around 20 percent by weight, based on weight of one or more additional copolymerizable monomers different from (a') and (b') like butylmethacrylate. The percentages by weight are based on the total weight of (a'), (b'), and (c') as 100 percent.

The Tg of the high Tg monomers mentioned above refers to the calculated value of the homopolymer made from the monomer calculated as described above by Fox. For example, the Tg of methyl methacrylate monomer and styrene monomer is 221° F. (105° C.). The Tg of the copolymer is typically between 77° F. and 158° F. (25° C. and 70° C.), and more preferably between 95° F. and 131° F. (35° C. and 55° C.).

For an epoxy functional copolymer present in the coating as the single film forming polymer, the copolymer generally has a number average molecular weight typically between 1000 and 5500. The preferred number average molecular weight for such an epoxy functional copolymer is between 1000 and 2500.

The epoxy functional copolymer can have from 3.0 to 5.9 moles of glycidyl functional ethylenically unsaturated monomer per kilogram of epoxy functional copolymer, more preferably between 3.5 and 5.1 moles of glycidyl functional monomer per kilogram of epoxy functional copolymer. The preparation of the epoxy copolymer as an epoxy-containing acrylic polymer may be conducted as disclosed in U.S. Pat. No. 4,650,718 (column 1, line 61 through column 3, line 40 and column 4, line 55 through column 9, line 15), incorporated herein by reference.

When the epoxy copolymer as the predominant film-forming polymer of the powder coating is a blend of the epoxy copolymers, the blend can range from around 10 to 90 to 90 to 10 of two of the aforementioned epoxy copolymers with the molecular weight and Tg ranges. Preferably, the ratio is around 25 to 75: 75 to 25 and the preferred molecular weight range and Tg range for each copolymer and delta Tg range are:

| Mw (grams) | Tg ° C. |
|---|---|
| i) about 4500 to about 7000 | about 40 to about 55 |
| ii) about 2000 to about 4500 | about 0 to about 40 |
| | delta Tg of about 5 to about 35 |

The epoxy copolymers for the blend are preferably two epoxy copolymers that are prepared in a similar manner as the single epoxy copolymer where the blend has a styrene content of from about 1 to about 16 and preferably from about 1 to about 10 weight percent for both epoxy copolymers. This means that one of the epoxy copolymers in the blend may have a styrene content greater than these ranges, but when considering the lower styrene content of the other epoxy copolymer in the blend and the ratios of each epoxy copolymer in the blend then the blend should not have a styrene content greater than the aforementioned ranges. The amounts of the aforementioned (a) and (b) monomers for both epoxy copolymers in the blend can be the same as those for the single epoxy copolymer comprising the predominant film forming polymer of the curable thermosetting powder clearcoat coating composition.

Suitable powder clear coating composition is prepared by combining approximately 60 to 90 percent by weight of the epoxy copolymer with about 10 to 40 percent by weight, based on total weight of the powder coating of a polycarboxylic acid crosslinking agent. When the epoxy copolymer is in an amount in the lower portion of the aforementioned range, minor amounts of other film-forming polymers known to those skilled in the art to be useful in powder coating can be used. Preferably, the polycarboxylic acid is a crystalline material, more preferably a crystalline aliphatic material containing from 4 to 20 carbon atoms. Examples of suitable acids include adipic, succinic, sebacic, azelaic and dodecanedioic acid. In addition, carboxylic acid functional polyesters may be used to crosslink the powder coating composition. Low molecular weight polyesters and half-acid esters can be used which are based on the condensation of aliphatic polyols with aliphatic and/or aromatic polycarboxylic acids or anhydrides, or the reaction of aliphatic polyols and aliphatic and/or aromatic anhydrides, respectively. Examples of suitable aliphatic polyols include ethylene glycol, propylene glycol, butylene glycol, 1,6-hexanediol, trimethylol propane, di-trimethylol propane, neopentyl glycol, 1,4-cyclo-hexanedimethanol, pentaerythritol and the like. The polycarboxylic acids and anhydrides may include those mentioned above, as well as terephthalic acid, isophthalic acid, phthalic acid, phthalic anhydride, tetrahydrophthalic acid, tetrahydrophthalic anhydride, hexahydrophthalic acid, methyltetrahexahydrophthalic anhydride, alkylhexahydrophthalic anhydride, chlorendic anhydride and the like. Mixtures of the polycarboxylic acids, anhydrides, and polyols may also be used.

Typically, the preferred range of an epoxy functional copolymer to a polycarboxylic acid crosslinking agent is between 70 to 85, preferably 70 to 80 percent by weight epoxy functional copolymer and between 15 to 30, more preferably 20 to 30 percent by weight polycarboxylic acid crosslinking agent, based on total weight of the powder coating composition. The use of aliphatic crystalline dicarboxylic acids is preferred, and in particular, dodecanedioic acid is most preferred. The advantage of these crystalline crosslinkers, particularly at the higher levels, is that generally they are incompatible with the epoxy functional copolymer providing for a more stable powder coating composition. However, when the powder coating composition is melted, the polyacid crosslinking agent is compatible and soluble in the acrylic copolymer acting somewhat as a diluent allowing for improved flow and appearance.

Additionally, polymer or copolymer flow control or flow modifying agents known to those skilled in the art can be used in the powder coating of the present invention. Suitable examples and amounts are shown in U.S. Pat. No. 5,212,245 (columns 2–4). Also, commercially available flow control polymers and copolymers can be used such as Modaflow (or Resiflow) flow additives, available from Monsanto Chemical Company of St. Louis, Mo., and the like. Generally, the weight average molecular weight of the copolymer flow control agents can range from about 1000 to 40,000, preferably 1000 to 15,000. Generally, the glass transition temperature (Tg) of the copolymer is less than 10° C. and preferably less than 0° C. and most preferably in the range of −60° C. to −10° C. The Tg can be calculated and measured in the aforedescribed manner. The Tg of the copolymer is not limiting of its performance as a flow additive but Tg's greater than 10° C. are not preferred because of decreased flow on coating application. A suitable amount of the flow control agent can be in the range of from about 0.01 to about 10 percent by weight based on total resin solids for the curable powder composition. With the preferred powder coating, the weight percent is of the total resins of the particulate film forming polymer and flow modifier. Preferably, the flow control copolymer will be included in the powder coating composition in amounts of 0.1 to 3 percent by weight, more preferably from about 0.5 to about 2 percent by weight for clearcoat applications.

The powder coating composition may optionally contain additives for wetting such as waxes, degassing additives such as benzoin, adjuvant resin to modify and optimize coating properties, ultraviolet (UV) light absorbers and curing catalyst such as those shown in U.S. Pat. No. 5,407,707, hereby incorporated by reference. These optional additives, when present, are used in amounts up to 11 percent by weight based on weight of resin solids of the coating composition.

Anti-popping agents can be added to the composition to allow any volatile material to escape from the film during baking. Benzoin is a commonly preferred anti-popping agent and when used is generally present in amounts of from 0.5 to 3.0 percent by weight based on total weight of the powder coating composition.

In addition, the powder coating composition may include fumed silica or the like to reduce caking of the powder during storage. An example of a fumed silica is sold by Cabot Corporation under the trademark CAB-O-SIL. The fumed silica is present in amounts ranging from 0.1 to 1 percent by weight based on total weight of the powder coating formulation.

The powder coating is typically prepared by blending the epoxy functional copolymer and the polycarboxylic acid crosslinking agent for 15 minutes in a Henschel blade blender. The powder is then usually extruded through a Baker-Perkins twin screw extruder uncatalyzed at a temperature between 230° F. and 235° F. (110° C. and 113° C.). A catalyst, such as methyl dicocoamine, is usually added and the powder blended in the Henschel blender, hammer milled and re-extruded at a temperature between 190° F. and 200° F. (87° C. and 93° C.). The finished powder then can be classified to a particle size of usually between 20 to 30 microns in a cyclone grinder/sifter. Usually, the powder coating composition has a melt viscosity of less than 5,000 centipoise, preferably less than 2,500 centipoise and more preferably less than 2,000 centipoise. The melt viscosity of the powder coating is measured using a Brookfield Model DV-II viscometer equipped with a No. 21 spindle. The test is performed by placing the epoxy functional copolymer or powder coating composition in a cell which is then loaded into a heated oven. When the copolymer or powder begins to melt, the No. 21 spindle is lowered into the cell and rotated. The melt viscosity in centipoise is plotted versus time in minutes. The lowest viscosity recorded, prior to gelling of the copolymer or powder coating, is taken as the melt viscosity. The measurement in centipoise (cps) is taken at the curing temperature of the powder coating, typically 275° F. (135° C.) at one revolution per minute (rpm).

Melt viscosity of the powder coating is a measurement of flow response. The lower the measured number, i.e., the lower the resistance to flow, the smoother the final film. The powder coating compositions of the present invention are prepared with a high Tg epoxy functional copolymers which provide good stability. The epoxy functional copolymers have relatively high melt viscosities and yet the melt viscosities of the powder coating compositions are low which results in excellent gloss and appearance of the cured coatings.

The clear coat composition is applied to the basecoat by any of the conventional coating techniques mentioned above, although spray applications are preferred. As mentioned above, the clear coat can be applied to a cured or dried basecoat before the basecoat has been cured. In the latter instance, the two coatings are then heated to conjointly harden both layers. This can occur by baking the composite coating at a temperature sufficient to cure the product, typically at about 250° F, to about 400° F, (121° C. to 204° C.) for about 1 to 60 minutes, and preferably at about 300° F. to 350° F. (149° C. to 177° C.) for about 10 to 30 minutes. The clear powder coating thickness is typically about 1 to 6 mils (25 to 152 microns) in dry film thickness, preferably about 1.5 to 3.5 mils (38 to 90 microns).

EXAMPLES

POWDER COATING EXAMPLES

An example of a powder coating formulation along with 12 illustrative examples were prepared. Example IP had the components shown in Table I below to comprise the powder coating. Illustrative Examples 2–13 were divided into two sets of formulations where each Illustrative Example had the same powder coating formulation as Example IP. As shown in Table II below, the even numbered Illustrative Examples had in addition a different extra component for each Illustrative Example. All of these extra components are those that typically can be present in a water-based basecoat composition. If such a basecoat component intermingles with the powder clearcoat in a composite coating, adverse consequences such as yellowing could occur. For the second set of odd numbered Illustrative Examples, one of each of the extra components added to the even numbered Illustrative Examples was added to one of the odd numbered examples at a higher amount. The powder coating was applied to a substrate and the result of the addition of the extra components to the basecoat component was evaluated.

The powder coating formulation of Example 1P was that of Table I below:

TABLE I (Epoxy-Acid Powder Coating)

| Component | Example 1P Parts by Weight (grams/Weight Percent) | Example 2P Parts by Weight (Weight Percent) |
|---|---|---|
| PD 9060 Polymer[a] | 803.8/74.1 | 69.81 |
| Dodecanedioic Acid | 196.2/18.1 | 21.44 |
| MODAFLOW III[b] | 8.2/0.76 | 0.95 |
| Benzoin | 8.7/0.8 | 0.2 |
| Microwax C[f] | — | 0.6 |
| TINUVIN 144[c] | 21.9/2.0 | 2.9 |
| TINUVIN 900[e] | 21.9/2.0 | 2.0 |

TABLE I-continued (Epoxy-Acid Powder Coating)

| Component | Example 1P Parts by Weight (grams/Weight Percent) | Example 2P Parts by Weight (Weight Percent) |
|---|---|---|
| cyclic organo-phosphorous compound[d] | 21.9/2.0 | 2.0 |
| Methyl Dicocoamine[e] | 2.7/0.25 | 1.0 |

[a]PD 9060 Polymer available from Anderson Development made in accordance with U.S. Pat. No. 4,042,645.
[b]MODAFLOW III is a 65 percent active powder acrylic copolymer on silica flow control additive, available from Monsanto Chemical Company of St. Louis, Missouri.
[c]TINUVIN 144 (2-tert-butyl-2-(4-hydroxy-3,5-di-tert-butylbenzyl)[bis (methyl-2,2,6,6,-tetramethyl-4-piperidinyl)]dipropionate) and TINUVIN 900 (2-(3',5'-bis(1-methyl-1-phenylethyl)-2'-hydroxyphenyl) benzotriazole) are ultraviolet light stabilizers available from Ciba-Geigy Corp.
[d]an anti-yellowing agent from Sanko Chemical Corporation or from International Resources, Inc. Columbia, Maryland 21046 and is 9,10-dihydro-9-oxa-10-phosphaphenanthrene-10-oxide, or 3,4,5,6-dibenzo-1,2-oxaphosphane-2-oxide as a white crystalline powder with a specific gravity of 1.40 at 30° C., and a melting point of 118° C. and a boiling point of about 200° C. at 5 mm Hg.
[e]is available from Akzo Chemicals Inc., Chicago, Illinois.
[f]Microwax C is a fatty acid amide available from Hoechst and is ethylene bis-stearoylamide.

The powder coating formulations of Examples 1P and 2P and the Illustrative Examples were prepared in the following manner. All components were weighed and blended for one minute in a Henschel Blade Blender. The mixture was extruded through a Werner & Pfleiderer twin screw extruder uncatalyzed at a temperature of 85° C. to 100° C. The extruded material was ground and classified on an AC1 grinder 20 to a particle size of 20 to 30 microns. For Illustrative Examples 2 through 13, the various extra components listed in Table II below were added separately to a separate powder coating composition like that of Example 1P. Each powder coating composition with the addition of a different type or amount of the component was prepared by blending the components together and blending, extruding and grinding to achieve a powder coating in the same manner as that for Example 1P. In one example, the extra component was added in a lower amount and in the following example the same component was added in a higher amount. All the amounts of the extra components are based on parts by weight of the powder coating formulation of Example 1P.

TABLE II

| Illustrative Examples | Component | Amount in Parts by Weight |
|---|---|---|
| 2 and 3 | m-pyrol | 1.1 and 5.5 |
| 4 and 5 | dimethylethanol amine | 1.1 and 5.5 |
| 6 and 7 | 4-ethyl morpholine | 1.1 and 5.5 |
| 8 and 9 | Cymel 303[A] | 1.1 and 5.5 |
| 10 and 11 | Cymel 202[B] | 1.1 and 5.5 |
| 12 and 13 | Resimene 741[C] | 1.1 and 5.5 |

[A]is a fully methylated melamine-formaldehyde resin with a degree of polymerization (average number of triazine units per molecule) of approximately 1.75 and a maximum free formaldehyde level of 0.5%. This material is supplied neat (minimum solids level 98%) by Cytec Corporation.
[B]is methyl butyl mix-etherified melamine resin available from Cytec Corporation.
[C]is a melamine resin available from Monsanto.

The powders made in Example 1P and Illustrative Examples 2-13 were electrostatically sprayed as film build wedges over white aluminum coil coated panels to eliminate any substrate effects. The film was cured at four bake schedules: 30 minutes at 285° F. (140° C.), 60 minutes at 285° F. (140° C.), and 30 minutes at 320° F. (160° C.) and 60 minutes at 320° F. (160° C).

The B color value, the blue yellow value, using the L* a* b* Color Notation System as measured by a Macbeth Color Eye Color System Spectrophotometer was measured at various film builds for each of the examples. The B values were plotted versus the clearcoat film build for each individual example and the best fit linear equation was calculated for each example. Using these equations, B values were calculated for 2.5 mils of clearcoat and comparisons were made for the effect of the basecoat components on the clearcoat yellowing. The delta B (dB) values were calculated by the difference between the B value of the control example from the B values of the other formulations. The resulting data are listed below in the Table III.

TABLE III

| | B Value 30 min. @ 285° F. | dB 30 min. @ 285° F. | B Value 60 min. @ 285° F. | dB 60 min. @ 285° F. | B Value 30 min. @ 320° F. | dB 30 min. @ 320° F. | B Value 60 min. @ 320° F. | dB 60 min. @ 320° F. |
|---|---|---|---|---|---|---|---|---|
| Example 1P | 2.52 | 0.00 | 2.63 | 0.00 | 2.93 | 0.00 | 3.38 | 0.00 |
| Illustrative Example 2 | 2.57 | 0.05 | 2.64 | 0.01 | 2.90 | −0.03 | 3.31 | −0.07 |
| Example 3 | 2.65 | 0.13 | 2.65 | 0.02 | 3.09 | 0.16 | 3.43 | 0.05 |
| Example 4 | 2.62 | 0.10 | 2.62 | −0.01 | 3.05 | 0.12 | 3.62 | 0.24 |
| Example 5 | 2.69 | 0.17 | 3.28 | 0.65 | 3.92 | 0.99 | 9.88 | 6.50 |
| Example 6 | 2.61 | 0.09 | 2.65 | 0.02 | 3.04 | 0.11 | 3.51 | 0.13 |
| Example 7 | 2.68 | 0.16 | 2.85 | 0.22 | 3.36 | 0.43 | 3.94 | 0.56 |
| Example 8 | 2.57 | 0.05 | 2.57 | −0.06 | 2.98 | 0.05 | 3.28 | −0.10 |
| Example 9 | 2.63 | 0.11 | 2.65 | 0.02 | 3.06 | 0.13 | 3.32 | −0.06 |
| Example 10 | 2.61 | 0.09 | 2.64 | 0.01 | 2.96 | 0.03 | 3.33 | −0.05 |
| Example 11 | 2.86 | 0.34 | 2.90 | 0.27 | 3.25 | 0.32 | 3.72 | 0.34 |
| Example 12 | 2.60 | 0.08 | 2.66 | 0.03 | 2.92 | −0.01 | 3.33 | −0.05 |
| Example 13 | 2.64 | 0.12 | 2.70 | 0.07 | 2.94 | 0.01 | 3.37 | −0.01 |

The results of Table III show that adding the extra component of a water-based basecoat to the powder clearcoat does have an effect on yellowing. At normal bake conditions (30 minutes at 285° F.), the Cymel 202 at the higher level has the greatest yellowing effect. At overbake condition of 320° F. (160° C.), the dimethylethanolamine (DMEA) has the greatest effect on yellowing.

WATER-BORNE BASECOAT EXAMPLES

From the results of Example 1P and Illustrative Examples 2–13, several water-borne basecoat formulations, some examples and some comparative examples, were prepared which were used in making a basecoat/clearcoat composite coating with the powder coating formulation of Example 1P and 2P as the clearcoat over the water-borne basecoat. The water-borne basecoat formulations were prepared in the below-indicated manner.

PREPARATION OF WATER-BORNE BASECOAT

PART A

Preparation of Latex

A polyurethane acrylate was prepared from the following ingredients:

| Amount (grams) | Material |
|---|---|
| 1000 | poly(neopentyl glycol adipate) having number average molecular weight of 1000, commercially available as FORMREZ 55-112 (Witco) |
| 116 | hydroxyethyl acrylate (HEA) |
| 1.4 | dibutyltin dilaurate |
| 1.4 | butylated hydroxy toluene |
| 244 | tetramethyl xylene diisocyanate (TMXDI) |
| 340 | butyl acrylate (BA) |

The first four ingredients were stirred in a flask as the TMXDI was added over a one-hour period at a temperature of 70° C. to 76° C. Ninety (90) grams of the butyl acrylate was used to rinse the addition funnel containing the TMXDI and the temperature of the mixture was then held at 70° C. for an additional two hours as all the isocyanate reacted. The remainder of the butyl acrylate was added to produce an 80 percent solution with a Gardner-Holdt viscosity of X, an acid value of 0.8, and a hydroxyl value of 29.

PART B

A pre-emulsion was made by stirring together the components as shown in the following Part B Table.

| Material | Amount (g) |
|---|---|
| polyurethane acrylate of Part A above | 4800 |
| butyl acrylate (includes BA contained in polyurethane acrylate solution) | 1920 |
| methyl methacrylate (MMA) | 880 |
| ethylene glycol dimethacrylate (EGDM) | 240 |
| acrylic acid | 160 |
| dimethylethanolammonium dodecylbenzene sulfonate and dimethylethanol amine, 50%/70% in water[a] | 720/50 |
| Aerosol OT-75[b] | 106.4 |
| 1% aqueous solution of ferrous ammonium sulfate | 64 |
| water | 5328 |

[a](DDBSA/DMEA) see column 12, U.S. Pat. No. 5,071,904.
[b]sodium dioctylsulfosuccinate commercially available from Cytec Industries Inc.

The pre-emulsion was passed once through a M110 Microfluidizer® emulsifier at 7000 psi to produce a stable, viscous, bluish-white microdispersion. The microdispersion was stirred at 22° C. in a five-gallon vessel and the following two initiator solutions were added.

|  | Amount (g) | Material |
|---|---|---|
| Solution 1: | 32 | ammonium persulfate |
|  | 114.4 | Igepal CO-897[a] |
|  | 2136 | water |
| Solution 2: | 32 | sodium metabisulfite |
|  | 2136 | water |

[a]ethoxylated nonylphenol (89% ethylene oxide) commercially available from GAF Corp.

The temperature rose spontaneously to 56° C. after 15 minutes. The final product had the following characteristics:

| | |
|---|---|
| Total solids = 43.6% | pH = 4.2 |
| Brookfield viscosity (50 rpm, #2 spindle) = 51 cps | Average particle size = 229 nm |
| cps = centipoise | nm = nanometers |

PART C

PREPARATION OF TWO PIGMENT DISPERSIONS FOR USE IN AQUEOUS BASECOAT COATING COMPOSITION

| Component | Example grind paste A Amounts by weight (lbs) | Example grind paste B Amounts by weight (lbs) |
|---|---|---|
| mineral spirits | — | 20.912 |
| Shellsolve 71[a] | 64.796 | 25.348 |
| water | 90.209 | — |
| Dowanol DPM[b] | | 27.249 |
| Dowanol PNB Propysol B[c] | | 25.348 |
| polypropylene glycol PPG-425 | | 33.586 |
| acrylic grind vehicle | 443.666 | 193.916 |
| water | | 63.372 |
| dimethylethanolamine 50% | 2.870 | — |
| dimethylethanolamine 50% in water | | 6.337 |
| Latex of Part B | | 121.672 |
| Titanium dioxide R-900 | 961.137 | 915.713 |
| water | | 87.452 |

[a]mineral spirits, available from Shell Chemical Company.
[b]a Propylene glycol methyl ether, available from Dow Chemical Company.
[c]Propasol P is propylene glycol monopropyl ether, available from Union Carbide Company.

PART D

PREPARATION OF PIGMENTED COATING COMPOSITIONS USING THE AFOREPREPARED LATEX

A white water-based basecoat was prepared with a 0.43/1.0 pigment to binder ratio as Example A and a second water-based basecoat was prepared with a pigment to binder ratio of 1/1 (Example B) in accordance with the following Part D Table.

TABLE

| Component | Example A (Grams) | Example B (Grams) | Example C (Grams/solids) | Example D (Grams/solids) | Example E (Grams/solids) |
|---|---|---|---|---|---|
| hexyl cellosolve[1] | 16.90 | 21.60 | 12.6/— | 12.6/— | 12.6/— |
| butyl carbitol[2] | 9.23 | 11.70 | 6.3/— | 6.3/— | 6.3/— |
| m-pyrrol | | | 12.6/— | 12.6/— | 12.6/— |
| odorless mineral spirits | 2.52 | 2.52 | 7.99/— | 7.99/— | 7.99/— |
| poly(propylene glycol) of molecular weight 425 | 8.39 | 10.50 | 4.98/4.98 | 4.98/4.98 | 4.98/4.98 |
| propylene glycol monopropyl ether | 3.36 | 3.36 | — | — | |
| RESIMENE 7554[3] | 22.45 | 22.45 | — | — | |
| RESIMENE 750 | | | 6.26/5.0 | — | |
| Cymel 385 | | | 6.26/5.0 | — | |
| Cymel 202 | | | — | — | 12.7/10.0 |
| Cymel 303 | | | — | 10.0/10.0 | — |
| Tinuvin 1100 | 2.52 | 2.50 | 4.04/4.04 | 4.04/4.04 | 4.04/4.04 |
| propylene glycol | 10.10 | 10.10 | — | — | |
| phosphatized epoxy[4] | | | 0.43/0.26 | 0.43/0.26 | 0.43/0.26 |
| acrylic grind vehicle[5] | 7.34 | 3.59 | 18.5/4.9 | 18.5/4.9 | 18.5/4.9 |
| white titanium dioxide grind paste-primary pigment (Example B of Part C)[6] | | 169.76 | — | — | — |
| white titanium dioxide grind paste-primary pigment (Example A of Part C)[7] | 107.10 | | — | — | — |
| tint paste[8] | 0.10 | 0.20 | — | — | — |
| tint paste[9] | 0.39 | 0.95 | 57.4/12.4 | 57.4/12.4 | 57.4/12.4 |
| 50/50 dimethylethanolamine in water | 2.00 | 1.60 | — | 8/— | — |
| water | 20.00 | 20.00 | — | — | — |
| Latex of Part B | 102.40 | 130.35 | 160.0/35.8 | 160.0/35.8 | 160.0/35.8 |
| W/B urethane acrylic[10] | | | 93.1/33 | 93.1/33 | 93.1/33 |
| Esterdiol 204 half ester[11] | | | 6.3/5.04 | 6.3/5.04 | 6.3/5.04 |
| water | 26.60 | 15.00 | 27.6/— | 19.9 | 23.4 |
| Total weight | 292.80 | 389.58 | 482.36/110.42 | 472.14/110.42 | 472.14/110.42 |
| spray viscosity (No. 4 Ford Cup inch) | 26.7 | 26.4 | 22 | 24 | 24 |
| initial pH | 8.1 | 8.1 | | | |
| adjusted pH | 8.6 | 8.6 | 8.5 | 8.5 | 8.5 |
| Theoretical Solids | | | 22.9% | 23.4% | 23.1% |

[1] Ethylene glycol monohexyl ether.
[2] Ethylene glycol monobutyl ether.
[3] This crosslinker was a methylated melamine formaldehyde condensation product commercially available from Monsanto.
[4] Phosphatized epoxy is Reaction product of 83 parts EPON 828 (diglycidyl ether of Bisphenol A available from Shell Oil and Chemical Co.) and 17 parts phosphoric acid at 55 percent weight solids.
[5] 35% butyl acrylate, 30% styrene, 18% butylmethacrylate, 8.5% 2hydroxyethyl acrylate, 8.5 % acrylic acid; at 27 % total solids dispersed in a mixture of deionized water and diethylene glycol monobutyl ether.
[6] Total solids of 117.42 and a resin solids of 15.19 and a pigment solids of 102.23.
[7] Total solids of 71.75 and a resin solids of 127.62 and a pigment solids of 44.13.
[8] Ingredients

| Ingredients | Grams |
|---|---|
| 1-Methoxy-2-propanol | 20.94 |
| Acrylic polymer[a] | 438.82 |
| Polyol[b] | 38.03 |
| Dimethylethanolamine, 50% in deionized water | 4.25 |
| Deionized water | 97.94 |
| Heliogen Blue pigment[c] | 85.21 |

Add the following premix to above ingredients:

| | |
|---|---|
| Polyurethaneacrylic latex[d] | 54.40 |
| Deionized water | 133.85 |

[a] 35% butyl acrylate, 30% styrene, 18% butyl methacrylate, 8.5% 2-hydroxyethyl acrylate, 8.5% acrylic acid; at 27% total solids dispersed in a mixture of deionized water and diethylene glycol monobutyl ether.
[b] Polypropylene glycol, commercially available from Union Carbide Chemicals and Plastics Co., Inc. as PPG425.
[c] Commercially available from BASF Corporation.
[d] Prepared according to U.S. Pat. No. 5,071,904, Example I.
[9] A black pigment paste was prepared by mixing together the following materials under suitable agitation in a suitable container, then grinding the pigment mixture in a horizontal mill.

| Ingredients | Grams |
|---|---|
| 1-Methoxy-2-propanol | 52.76 |
| n-Propoxy propanol | 52.76 |
| Deionized water | 97.66 |
| Acrylic polymer[a] | 585.89 |
| Dimethylethanolamine, 50% in deionized water | 13.30 |
| Carbon black pigment | 54.05 |

[a] 35% butyl acrylate, 30% styrene, 18% butyl methacrylate, 8.5% 2-hydroxyethyl acrylate, 8.5% acrylic acid; at 27% total solids dispersed in a mixture of deionized water and diethylene glycol monobutyl ether.
[b] Commercially available from Cabot Corporation as Monarch 1300.
[10] A polyurethane dispersion prepared as follows:

| Feed | Ingredient | Parts by weight |
|---|---|---|
| 1. | Methylene dicyclohexyl diisocyanate | 183.5 |
| 2. | DDI 1410 diisocyanate[a] | 106.5 |
| 3. | FORMREZ ® 66-56[b] | 295.0 |
| 4. | Dibutyltin dilaurate | 0.5 |
| 5. | Dimethylol propionic acid | 45.6 |

TABLE-continued

| Component | | Example A (Grams) | Example B (Grams) | Example C (Grams/solids) | Example D (Grams/solids) | Example E (Grams/solids) |
|---|---|---|---|---|---|---|
| 6. | Methyl ethyl ketone | 143.6 | | | | |
| 7. | Methyl methacrylate | 246.0 | | | | |
| 8. | Butyl acrylate | 188.7 | | | | |
| 9. | Dimethylethanol amine | 30.3 | | | | |
| 10. | Ethylene diamine | 21.3 | | | | |
| 11. | Deionized water | 1625.0 | | | | |
| 12. | Ferrous ammonium sulfate (1% aqueous solution) | 1.5 | | | | |
| 13. | Isoascorbic acid | 1.0 | | | | |
| 14. | Hydrogen peroxide (35% aqueous solution) | 1.5 | | | | |
| 15. | Deionized water | 87.5 | | | | |

$^a$2-heptyl-3, 4-bis(9-isocyanato nonyl)-1-pentylcyclohexane from Henkel Corporation.
$^b$Poly(neopentyl adipate), molecular weight about 2000, from Witco Corporation.
Into a clean dry reactor equipped with heating, cooling, stirring and a nitrogen blanket were charged feeds 1 to 6. The reaction mixture was heated to 70° C. and held at this temperature for 2 hours. After this hold, feeds 7, 8, and 9 were added to the reaction product while cooling the reactor to 35° C. The prepolymer/monomer mixture was then transferred into another reactor containing feeds 10 and 1 1. The resulting dispersion was heated to 40° C., followed by the addition of feeds 12, 13, 14, and 15. The solution exothermed to about 60° C. The product thus formed had the following physical properties: total solids of about 35%, pH of about 8. 1, viscosity of about 100 centipoise.
$^{11}$A polyacid halfester of 1-(3-hydroxy-2,2-dimethylpropyl)-3-hydroxy-2,2-dimethylpropionate (Ester Diol 204) and methylhexahydrophthalic anhydride (ED 204/MHHPA) prepared in accordance with Example A of U.S. Pat. No. 5,510,148.

BASE NEUTRALIZATION TESTS FOR LATEX

As shown in Table IV for Examples 14–17 and Comparative Examples I and II, several separate latices of Part B above were neutralized to a pH of about 8.6, generally from a pH of 4.1 in preparing the water-borne basecoat of Example B of Part D above. The neutralization was performed with one of several different neutralizing agents in different amounts based on 100 grams of paint solids. The neutralization was performed as follows:

TABLE IV

Ingredients

| Example | I. Neutralizing agent | Grams | Order of Less Yellowing |
|---|---|---|---|
| 14 | N,N-dimethylethanolamine (DMEA) | 1.0 | #1 best |
| 15 | N,N-dimethyltriethylenediamine | 1.3 | #2 |
| 16 | diisopropanolamine | 2.95 | #3 |
| 17 | triethanolamine | 8.0 | #4 |
| comparative example I | Armeen DM12D$^A$ | 7.5 | #5 |
| comparative example II | potassium hydroxide (10%) | 5.6 | #6 worst |

$^A$is a long chain alkyl fatty amine from Akzo-Nobel Chemical Inc.

The neutralized pre-emulsions were prepared with the amount of base or neutralizing agent indicated in TABLE IV added to an amount of the pre-emulsion such as:

| | |
|---|---|
| pre-emulsion of latex of Part B | 134.2 |
| 50 percent solution of neutralizing agent of Table IV in amount shown in Table IV in deionized water. | |

A water-borne basecoat coating composition was prepared by combining together the components of Example B as a neutralized latex, pigment paste(s), and adjusting the pH to 8.6 by adding the aforementioned amounts of the specified amine in Table IV.

For Table V in Examples 18 through 22, several water-borne basecoat compositions of Example B of Part D above were prepared where the Latex of Part B above was neutralized to a pH of about 8.6 generally from a pH of 4.1 as described generally for Table IV. The neutralization was performed with one of several different neutralizing agents in different amounts based on 100 grams of paint solids for each example. The neutralization was performed by adding the specific amine to adjust the pH to a value of 8.6, unless indicated otherwise, with constant agitation of the basecoat. The basecoats of Table V were applied to a substrate as that for Table III. Generally, the basecoat coating composition which was applied to the substrate in a typical spray process had the following characteristics: Package solids 44.3%; Spray solids 38.5%; and Spray viscosity (No. 4 Ford cup) 16 seconds. The epoxy-acid powder clearcoat of Example 1P was applied in a similar manner as that for Table III in wedges of film build.

From Table IV, the secondary and tertiary amines and alkanolamines used in smaller amounts give less yellowing than the inorganic base KOH and the alkylamine cationic surfactant at higher amounts. Primary amines could also be neutralizing agents as long as the amount of amine added to adjust the pH is not too high. Also from Table V, the amine neutralizing agents have a similar effect on yellowing of the powder clearcoat at a pigment to binder ratio of 1/1, where yellowing increases at thicker film builds of the clearcoat as shown by the higher Delta B color numbers.

TABLE V

| Example | Description | Basecoat DFT Mils | Film Build Clearcoat | Delta B | Film Build Clearcoat Mils | Delta B | Film Build Clearcoat | Delta B | Film Build Clearcoat | Delta B |
|---|---|---|---|---|---|---|---|---|---|---|
| 18 | DMEA Control | 1 | 2 | 2.83 | 2.5 | 3.43 | 3 | 4.01 | 3.6 | 4.77 |
| 19 | Triethylamine to 8.5 pH | 1.01 | 2 | 2.49 | 2.5 | 3.25 | 3 | 4.06 | 3.6 | 4.4 |

TABLE V-continued

| Example | Description | Basecoat DFT Mils | Film Build Clearcoat | Delta B | Film Build Clearcoat Mils | Delta B | Film Build Clearcoat | Delta B | Film Build Clearcoat | Delta B |
|---|---|---|---|---|---|---|---|---|---|---|
| 20 | Triethylamine equivalent to DMEA | 0.99 | 2 | 2.62 | 2.5 | 3.34 | 3 | 3.78 | 3.6 | 4.37 |
| 21 | Diisobutylamine to 8.5 pH | 0.96 | 2.14 | 2.88 | 2.9 | 3.24 | 3.5 | 3.95 | 3.96 | 4.26 |
| 22 | Diisobutylamine equivalent to DMEA | 0.99 | 2.14 | 2.75 | 2.9 | 3.44 | 3.5 | 3.83 | 3.96 | 4.05 |

TABLE VI

| (WHITE) SYSTEMS EXAMPLES | P/B | DESCRIPTION | BASE DFT | CLEAR DFT | DELTA B | CLEAR DFT | DELTA B | CLEAR DFT | DELTA B | CLEAR DFT | DELTA B |
|---|---|---|---|---|---|---|---|---|---|---|---|
| Comparative III | 1-1 | 17.5% Resimene 7554HM | 0.95 | 1.4 | 2.16 | 2.2 | 3.56 | 3 | 4.37 | 3.4 | 4.85 |
| Comparative IV | 1-1 | 25% Resimene 7554HM | 0.99 | 1.4 | 2.23 | 2.2 | 3.74 | 3 | 5.59 | 3.4 | 5.13 |
| Comparative V | 1-1 | 32.5% Resimene 7554HM | 1 | 1.4 | 2.23 | 2.2 | 3.18 | 3 | 5.34 | 3.4 | 5.39 |
| 23 | 1-1 | 17.5% Cymel 322 | 0.96 | 1 | 1.3 | 1.7 | 2.39 | 2.4 | 3.24 | 3.6 | 3.64 |
| 24 | 1-1 | 25% Cymel 322 | 0.95 | 1 | 1.47 | 1.7 | 2.72 | 2.4 | 3.57 | 3.6 | 4.23 |
| 25 | 1-1 | 32.5% Cymel 202 | 0.95 | 1 | 1.34 | 1.7 | 2.41 | 2.4 | 3.52 | 3.6 | 3.64 |
| 26 | 1-1 | 17.5% Cymel 202 | 0.95 | 1 | 1.62 | 1.7 | 2.65 | 2.4 | 3.78 | 3.6 | 4.24 |
| 27 | 1-1 | 25% Cymel 202 | 1.08 | 1 | 1.5 | 1.7 | 2.22 | 2.4 | 3.1 | 3.6 | 3.79 |
| 28 | 1-1 | 32.5% Cymel 202 | 1.1 | 1 | 1.59 | 1.5 | 2.5 | 2.86 | 4.02 | 3.4 | 4.01 |
| 29 | 1-1 | 17.5% Cymel 303 | 1.04 | 1 | 1.86 | 1.5 | 2.37 | 2.86 | 3.13 | 3.4 | 3.18 |
| 30 | 1-1 | 25% Cymel 303 | 1.08 | 1 | 1.96 | 1.5 | 2.86 | 2.86 | 3.88 | 3.4 | 3.87 |
| 31 | 1-1 | 32.5% Cymel 303 | 1.06 | 1 | 2.02 | 1.5 | 2.9 | 2.86 | 3.62 | 3.4 | 3.43 |

Cymel 322 is a partially iminated melamine formaldehyde resin available from Cytec Industries Inc.
Resimene 7554HM is a formaldehyde available from Monsanto.
Cymel 202 is a methyl butyl mix-etherified melamine resin available from Cytec Industries Inc.

In Table VI, Comparative Examples III-V and Examples 23–31 each have a water-borne basecoat composition of Example A of Part D above, which were prepared with the Latex of Part B, above, that was neutralized to a pH of about 8.6 generally from a pH of 4.1 with DMEA in a similar manner to that of Example 14. Example A basecoat of the Part D Table was changed in all of these examples to have a 1 to 1 pigment to binder ratio. Also, Example A was changed in Comparative Examples III-V by a different amount of the melamine crosslinking agent that was added. Three different amounts, 17.5%, 25%, and 32.5%, by weight of the resin solids were used in Comparative Examples III through V, respectively. Examples 23 through 31 changed the Example A formulation by changing the melamine formaldehyde crosslinker and varying the amounts to similar percentages as above for Comparative Examples III through V.

The basecoats of Table VI were applied to a substrate as that for Table III. Generally, the basecoat coating composition which was applied to the substrate in a typical spray process had the following characteristics: Package solids 44.3%; Spray solids 38.5%; and Spray viscosity (No. 4 Ford cup) 16 seconds. The epoxy-acid powder clearcoat of Example 1P was applied by electrostatic spraying as a clearcoat in a similar manner as that for Table III in wedges of film build. The coating examples were baked at around 275° F. (135° C.) for 30 minutes. The composite coating composition of the water-borne basecoat and the powder clear was applied and evaluated as described above, in Example I for the clearcoat and as in Table V for the effect on yellowing of the clearcoat in the composite coating. From the results of Table VI, it is observed that the Cymel 303 with a lower imino content crosslinker was the best crosslinker with Cymel 202 a higher imino content crosslinker a close second where both are preferably used in an amount of less than 25 percent of resin solids of the water-based basecoat. The Resimine 7554 gave the worst results.

EXAMPLE FOR HIGHER IMINO CONTENT CROSSLINKER FOR CHIP IMPROVEMENT

In a similar manner to the basecoats of Tables V and III, the water-borne basecoats of Examples C, D and E of Table D were coated onto the substrate. Subsequently, the powder clear coating of Example 2-P of Table I was prepared and applied on the base coat for Monochip testing in the following manner. The test panels coated with electrocoat primer, commercially available from PPG Industries, Inc. as ED-5000, were first primed to a film thickness of about 1.1 to 1.3 mils (28 to 33 $\mu$) with an automotive solvent borne black primer commercially available from Mehnert & Veek, Germany, then baked for 20 minutes at 320° F. Separate test panels were then basecoated, by spray application to a film thickness of about 0.6 mils (15.2 $\mu$), with one of the waterborne base coats of Examples C, D and E of Table D. The basecoated panels were then flash baked for 10 minutes at 176° F. (80° C.) before electrostatically spray applying the powder clearcoat composition of Example 2P. The powder coated panels were then cured for 30 minutes at 285° F. (140° C). The dry film thickness (DFT) of the powder clear was targeted for 2.3 to 3.5 mils (58 to 89 $\mu$). The test panels were tested for chip resistance using the Monochip test described below, and the results are given in Table VII.

TABLE VII

|  | Illustrative Example I | Example 1 | Example 2 |
|---|---|---|---|
| Primer Dried Film Thickness | 1.34 | 1.40 | 1.34 |
| Monochip* |  |  |  |
| Initial (Room Temp) |  |  |  |
| mm | 3 | 3 | 4 |
| Mode | M | M | C |
| % Adh. Primer** | 25 | 25 | 25 |
| −20° C. |  |  |  |
| mm | 5.5 | 4.5 | 4 |
| Mode | A | C | C |
| % Adh. Primer | 100 | 25 | 25 |

*Monochip Test: The test panels were chipped with the use of a Byk-Gardner Mono-chip Tester. This machine uses an air driven piston to impact the test panel with a small steel mallet shaped like a screw-driver head. The pressure used was 43 psi (3 bar). Three impacts were run at ambient conditions, then the test panel was placed in a freezer at −20° C. and allowed to equilibrate. Within one minute after removing the test panel from the freezer, the panel was impacted three more times in the Byk-Gardner Mono-chip Tester. Next, the panels were tape tested by covering the impact zone of the panel with Tesa 4651 tape from Beiersdorf AG, Hamburg, Germany, and then removing the tape from the test panel in one rapid pull. The "Mode" of failure or loss of adhesion of the coating after tape testing is designated "C" for cohesive failure when there is a loss of adhesion between layers of coating, "A" for adhesive failure when there is loss of adhesion to the metal substrate, and "M" for mixed adhesive and cohesive failures. A cohesive failure mode is preferred over an adhesive failure mode. The rating is the average width of paint loss from the impact areas measured in millimeters. Monochip ratings less than 6 millimeters are considered acceptable.
**% Adhesive Primer is a determination of the relative percentage of adhesive failure and cohesive failure between the primer and basecoat layers of the composite coating where higher numbers indicate more adhesive failure.

Table VI shows the improvement in chip resistance of the composite coating of the water-borne basecoat with the higher imino content melamine crosslinker of Examples 1 and 2 as opposed to the lower melamine crosslinker of the Illustrative Example I in the composite with the powder clearcoat. The extent of the chip in mm is generally less for Examples 1 and 2, especially in the cold chip testing.

We claim:

1. A multi-component composite coating composition comprising a pigmented film-forming composition serving as a base coat and a clear film-forming composition serving as a transparent coat over the base coat, comprising:
   (A) curable water-borne base coat coating composition having:
   (1) from 10 to 90 weight percent based on resin solids content of one or more water soluble, dispersible or reducible film-forming polymeric binders with pendent acid functionality, wherein the polymeric binder is selected from the group consisting of acrylic polymers, polyesters, blends of acrylic polymers and polyesters, and blends of acrylic polymers and polyurethanes, wherein the acid groups are neutralized with an organic base selected from the group consisting of: primary amines, secondary amines, tertiary amine, alkanolamines, and alkyl and dialkyl diamines and triamines to provide a pH of about 7.0 to 9 for the neutralized basecoat where the concentration of neutralizing organic base is such that the degree of neutralization is from 0.5 to 1.5 equivalents of amine per carboxyl group;
   (2) a pigment where the pigment to film-forming binder weight ratio is in the range of 0.1/1 to 2/1;
   (3) less than 60 weight percent of at least one aminoplast condensation crosslinking agent having an imino content of greater than 15 and up to about 65 weight percent of the functional substituents of the aminoplast crosslinking agent; and
   B) epoxy-acid powder clearcoat coating composition having a melt viscosity less than 5000 centipoises and having a solid, particulate mixture of:
   (1) 10 to 90 percent by weight based on weight of (B)(1) and (B)(2) of at least one epoxy functional acrylic copolymer with a number average molecular weight in the range of 1,000 to 20,000;
   (2) 10 to 40 percent by weight based on weight of (B)(1) and (B)(2) of a polycarboxylic acid crosslinking agent;
   where the equivalent ratio of the (B)(1) and (B)(2) in the clearcoat film-forming composition is adjusted such that for each equivalent of epoxy, there are around 0.3 to around 3.0 equivalents of carboxyl.

2. The coating composition of claim 1 wherein the water-borne basecoat includes phosphatized epoxy.

3. The coating composition of claim 1 wherein the aminoplast condensation crosslinking agent is present in an amount from 10 to 60 percent by weight based on the total resin solids in the basecoat composition.

4. The coating composition of claim 1 wherein the reduced yellowing type of aminoplast is a mixed alkyl etherified methylol melamine formaldehyde condensate resin which has all of the butyl ether groups, methyl ether groups, and methylol groups but not all imino groups on a single melamine nucleus alone and in mixtures with methyl etherified methylol melamine condensate resin alone and with butyl etherified methylol melamine resin alone and with mixed alkyl etherified methylol melamine resin.

5. The coating composition of claim 1 wherein the reduced yellowing type of aminoplast is a mixed alkyl etherified methylol melamine condensate resin that is a mixture of mononuclear molecules and polynuclear molecules.

6. The coating composition of claim 1 wherein the improved chip resistance type of aminoplast condensation crosslinking agent is partially methylated melamine formaldehyde condensate in isobutanol.

7. The coating composition of claim 1 wherein the improved chip resistance type of aminoplast condensation crosslinking agent is selected from the group consisting of partially iminated melamine formaldehyde resin and methyl butyl mix-etherified melamine resin, and hexaalkoxymethyl melamine of mixed methoxy/butoxy (1:1) functionalities.

8. The coating composition of claim 1 wherein the organic base for neutralization is selected from the group consisting of: N,N-dimethylethanolamine (DMEA), N,N-dimethyltriethylenediamine, diisopropanolamine, triethanolamine, and mixtures thereof.

9. The coating composition of claim 1 wherein the improved chip resistance type of aminoplast is present when the pigment is black.

10. The coating composition of claim 1 wherein the epoxy-acid powder has at least one epoxy functional acrylic copolymer formed by polymerizing under free radical initiated conditions:
   (i) 25 to 75 percent by weight based on weight of (i) and (ii) of a glycidyl functional ethylenically unsaturated monomer,
   (ii) 25 to 75 percent by weight based on weight of (i) and (ii) of a copolymerizable ethylenically unsaturated monomer or mixture of monomers free of glycidyl functionality.

11. The coating composition of claim 10 wherein the at least one epoxy functional acrylic copolymer is formed by polymerizing under free radical initiated conditions:
  (i) 50 to 75 percent by weight based on weight of (i) and (ii) of a glycidyl functional ethylenically unsaturated monomer,
  (ii) 25 to 50 percent by weight based on weight of (i) and (ii) of a copolymerizable ethylenically unsaturated monomer or mixture of monomers free of glycidyl functionality.

12. The coating composition of claim 1 wherein in the epoxy-acid powder the ratio of epoxy functionality to acid functionality is about 1:0.8 to 1.

13. The coating composition of claim 1 wherein in the epoxy-acid powder clear composition said epoxy functional copolymer contains from 3.0 to 5.9 moles of glycidyl groups per kilogram of epoxy functional copolymer.

14. The coating composition of claim 1 wherein in the epoxy-acid powder the at least one epoxy functional acrylic copolymer has a number average molecular weight in the range of 1,000 to 10,000.

15. The coating composition of claim 1 wherein in the epoxy-acid powder the at least one epoxy functional acrylic copolymer has a number average molecular weight in the range of 1,000 to 6,000.

16. The coating composition of claim 1 wherein in the epoxy-acid powder clearcoat composition, where the at least one epoxy copolymer is the predominant film forming polymer of the powder coating and is present as a blend of epoxy functional acrylic copolymers, where the blend has the range from around 10 to 90 to 90 to 10 of the two epoxy copolymers with the molecular weight and Tg ranges and the delta Tg range of:

| Mw (grams) | Tg ° C. |
|---|---|
| A) about 4500 to about 7000 | about 40 to about 55 |
| B) about 2000 to about 4500 | about 0 to about 40 |
|  | delta Tg of about 5 to about 35. |

17. The coating composition of claim 16 wherein the ratio of the blend of epoxy copolymers is around 25 to 75:75 to 25.

18. The coating composition of claim 16 wherein the blend has a styrene content of from about 1 to about 16.

19. The coating composition of claim 1 wherein at least one of the epoxy functional acrylic copolymers has a Tg of 95° F. to 131° F. (35° C. to 55° C.).

20. The coating composition of claim 10 wherein in the powder coating composition the copolymerizable ethylenically unsaturated monomer (ii) is selected from the group consisting of alkyl acrylates, alkyl methacrylates containing from 1 to 20 carbon atoms in the alkyl group, vinyl aromatic compounds and vinyl aliphatic compounds.

21. The coating composition of claim 1 wherein in the powder coating composition the epoxy functional copolymer is a copolymer of:
  (i) 50 to 65 percent by weight of glycidyl acrylate or methacrylate;
  (ii) 25 to 40 percent by weight of one or more copolymerizable ethylenically unsaturated monomers having a Tg greater than 200° F. (93° C.); and
  (iii) 5 to 15 percent by weight of copolymerizable ethylenically unsaturated monomers different from (i) or (ii).

22. The coating composition of claim 1 wherein in the powder coating composition the epoxy functional copolymer is a copolymer of:
  (i) 50 to 65 percent by weight of glycidyl acrylate or methacrylate;
  (ii) 25 to 40 percent by weight of isobornyl methacrylate; and
  (iii) 5 to 15 percent by weight of copolymerizable ethylenically unsaturated monomers different from (i) or (ii).

23. The coating composition of claim 1 wherein in the powder coating composition the equivalent ratio of the (B)(1) and (B)(2) in the clearcoat film-forming composition is adjusted such that for each equivalent of epoxy, there are around 0.75 to around 1.5 equivalents of carboxyl.

24. The coating composition of claim 1 wherein in the powder coating composition contains alpha-methyl styrene dimer.

25. The coating composition of claim 1 wherein in the powder coating composition the polycarboxylic acid is a crystalline material containing from 4 to 20 carbon atoms.

26. The coating composition of claim 1 wherein in the powder coating composition the polycarboxylic acid is dodecanedioic acid.

27. The coating composition of claim 1 wherein in the powder coating composition the epoxy copolymer (1) is present in an amount in the range of 60 to 90 percent by weight and the polycarboxylic acid crosslinking agent is present in an amount in the range of about 10 to 40 percent by weight, wherein the weight percents are based on the total weight of (1) and (2) in the powder coating.

28. The coating composition of claim 27 wherein in the powder coating composition (1) is present in an amount of 70 to 85 percent by weight and (2) is resent in an amount of 15 to 30 percent by weight.

29. The coating composition of claim 1 wherein in the powder coating composition said epoxy functional copolymer contains from 3.0 to 5.1 moles of glycidyl functional ethylenically unsaturated monomer per kilogram of epoxy functional copolymer.

30. The coating composition of claim 1 wherein the powder coating composition has a melt viscosity less than 2000 centipoises.

31. A multi-component composite coating composition comprising a pigmented film-forming composition serving as a base coat and a clear film-forming composition serving as a transparent coat over the base coat, comprising;
  (A) water-borne base coat coating composition having:
    (1) from 10 to 90 weight percent based on resin solids content of one or more water soluble, dispersible or reducible film-forming polymeric binders with pendent acid functionality, wherein the polymeric binder is selected from the group consisting of acrylic polymers, polyesters, blends of acrylic polymers and polyesters, and blends of acrylic polymers and polyurethanes, wherein the acid groups are neutralized with an organic base selected from the group consisting of: primary amines, secondary amines, tertiary amine, alkanolamines, and alkyl and dialkyl diamines and triamines to provide a pH of about 7.0 to 9 for the neutralized basecoat where the concentration of neutralizing organic base is such that the degree of neutralization is from 0.5 to 1.5 equivalents of amine per carboxyl group;

(2) less than 60 weight percent of aminoplast condensation crosslinking agent selected from the group consisting of aminoplast with an imino content in the range of greater than 15 and up to 65 weight percent of the functional substituents of the aminoplast; and
(3) a pigment where the pigment to film forming binder weight ratio is in the range of 0.1/1 to 2/1;

(B) epoxy-acid powder clearcoat coating composition having a solid, particulate mixture of:
(1) 10 to 90 percent by weight based on weight of (B)(1) and (B)(2) of at least one epoxy functional acrylic copolymer with a number average molecular weight in the range of 1,000 to 20,000;
(2) 10 to 40 percent by weight based on weight of (B)(1) and (B)(2) of a polycarboxylic acid crosslinking agent; where the equivalent ratio of the (B)(1) and (B)(2) in the clearcoat film-forming composition is adjusted such that for each equivalent of epoxy, there are around 0.3 to around 3.0 equivalents of carboxyl.

* * * * *